United States Patent [19]

Geeves

[11] Patent Number: 4,884,733
[45] Date of Patent: Dec. 5, 1989

[54] STORAGE CONTAINER FOR USE IN TRUNKS OF VEHICLES

[76] Inventor: Garry L. Geeves, 30927 Steeplechase Dr., San Juan Capistrano, Calif. 92675

[21] Appl. No.: 211,763

[22] Filed: Jun. 27, 1988

[51] Int. Cl.⁴ ............................................... B60R 7/00
[52] U.S. Cl. .................... 224/311; 224/328; 206/335; 220/22.1; 220/377
[58] Field of Search ............ 224/311, 42.42, 906, 224/328; 220/20, 22, 22.1, 287, 306, 22.3, 377, 21; 206/335, 223, 373; 229/120.13, 120.14

[56] References Cited

U.S. PATENT DOCUMENTS

| | | | |
|---|---|---|---|
| 1,661,728 | 3/1928 | La Rue | 220/20 |
| 2,724,595 | 11/1955 | Amann | 220/20 |
| 3,237,824 | 3/1966 | Gunckel | 224/42.42 R |
| 3,513,969 | 11/1968 | Roff | 206/335 |
| 3,940,009 | 2/1976 | Szeles | 220/20 |
| 4,084,865 | 4/1978 | Joyce | 220/22 |
| 4,358,035 | 11/1982 | Heidecker | 224/42.42 R |
| 4,499,997 | 2/1985 | Swingley, Jr. | 220/22 |
| 4,512,503 | 4/1985 | Gioso | 224/42.42 R |
| 4,669,609 | 6/1987 | Lugo | 220/20 |
| 4,790,256 | 12/1988 | Levine | 224/328 |
| 4,793,648 | 12/1988 | Zerilli | 224/42.42 |

FOREIGN PATENT DOCUMENTS

| | | | |
|---|---|---|---|
| 2140164 | 2/1973 | Fed. Rep. of Germany ... | 224/42.42 R |
| 2726575 | 12/1978 | Fed. Rep. of Germany ... | 224/311 |
| 2741111 | 3/1979 | Fed. Rep. of Germany ... | 224/311 |
| 2906262 | 8/1980 | Fed. Rep. of Germany ... | 220/22 |
| 3147104 | 3/1983 | Fed. Rep. of Germany ... | 224/311 |
| 862378 | 3/1961 | United Kingdom ......... | 224/42.42 R |

Primary Examiner—Henry J. Recla
Assistant Examiner—Edward C. Donovan

[57] ABSTRACT

A new type of storage container for use in storing materials, such as papers, brief cases, etc. in the trunk of a vehicle for those who use the trunk as an office, comprising a rectangular open top box prepared from plastic sheet material, and preferably clear plastic sheets, plastic sheet divider members fixedly attached to the two side and dividing the box into at least three separate sections, the first and front section capable of receiving a conventional brief case, and the second and third sections being subdivided into at least two subsections each, and a plastic sheet removable top which covers all but the first section of the box.

7 Claims, 3 Drawing Sheets

STORAGE CONTAINER FOR USE IN TRUNKS OF VEHICLES

BACKGROUND OF THE INVENTION

1. Field of the Invention

This invention relates to storage containers, and more particularly to a new type of storage container for use in storing material in trunks of vehicles.

Specifically, the invention provides a new type of storage container for use in storing materials, such as papers, brief cases, books, etc. in the trunk of a vehicle to provide protection and easy access to the same. The new storage containers broadly comprise a rectangular open top box having a bottom, two sides and 2 shorter end members prepared from plastic sheets, and preferably clear plastic sheets, plastic sheet divider members fixedly attached perpendicular to the two sides and dividing the box into at least three separate sections, the first and front section being capable of receiving a conventional brief case, the second and third sections possessing adjustable sub-divider plastic members dividing each section into at least two subsections, said subdivider members being perpendicular to the ends of the box, and a plastic sheet removable top which covers all but the first section of the box.

The invention further provides a method for using the above-noted storage container in the trunk of vehicles to provide protection and easy access to the paper and other goods to be stored in the trunk.

2. Prior Art

Many professional personnel, such as salesmen, real estate agents, contractors, etc. are required to carry in their cars a great many different types of paper goods, such as maps, drawings, pamphlets, books, calculators, brief cases, and the like. This material is generally thrown in the back seat or in the trunk and and is easily torn, mixed up with other material, or lost. This causes a great deal of confusion and loss of valuable time to the operator of the vehicle. It would be very desirable, therefore, to find an efficient method for the storage of such material in a vehicle so that the papers could be easily and quickly found and the papers could be protected from being lost or destroyed.

It is an object of the invention, therefore, to provide for the first time an efficient and economical way to store the above-noted material in the trunk of a vehicle. It is a further object to provide an effective process for storing of paper material and other objects in the trunk of a vehicle to present easy access thereto and protect the said material from being lost or destroyed. These and other objects will be apparent from the following detailed description thereof.

SUMMARY OF THE INVENTION

It has now been discovered that these and other objects can be accomplished by the new storage containers of the present invention which provides for the first time an efficient and economical way for the protection of the above-noted materials generally used by the professional personnel requiring the use of a vehicle for their office.

The new storage containers of the present invention comprise in combination a rectangular open top box from 10 to 12 inches in height and having a bottom, two sides and 2 shorter end members prepared from plastic, and preferably clear plastic, sheets, a first set of plastic divider members fixedly attached perpendicular to the sides and dividing the box into at least three separate compartments, the first and front compartment being from six to eight inches in width and capable of receiving a brief case, the second and third and other compartments possessing adjustable sub-divider sheet members dividing each compartment into at least two subsection compartments, said sub-divider members being perpendicular to the ends of the box, and a plastic sheet removable top member which covers all but the first compartment of the box.

It has been surprisingly found that when the above-noted new storage containers are placed in the trunk of a vehicle they can provide the much needed storage space for the articles used by the above-noted professional personnel. Convenient space is provided for the conventional brief case as well as the usual books, catalogues, pamphlets, maps, etc. Each article can be assigned a specific location so that it can be easily and quickly located when needed. In addition, the top can be placed over the various compartments so as to provide protection from the dirt and dust in the trunk as well as keep the articles in their proper location. As the storage container is preferably made of clear plastic sheets, one can quickly note by looking through the sides where the needed material can be located. Further advantage is found in the fact that in the event the total material needs to be moved into an office or home for further use, the container can be easily picked up and removed to the proper place and then returned to the trunk for the next use.

DESCRIPTION OF THE DRAWINGS

The various objects and features of the present invention will be more fully understood by reference to the accompanying drawings.

DETAILED DESCRIPTION OF THE DRAWINGS

Figure 1:
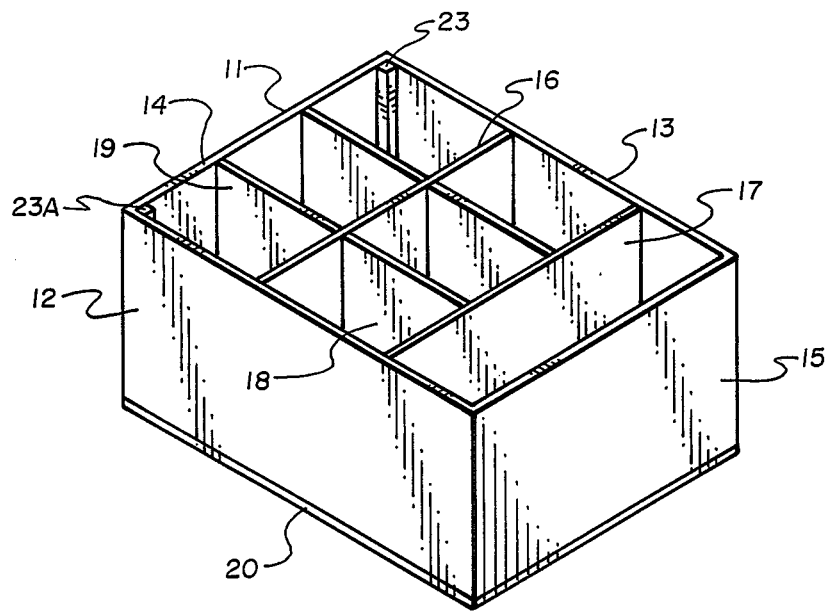
FIG. 1 is a perspective view of the new storage containers of the present invention.

Referring now to the drawings:

With reference to FIG. 1 which is a perspective view the storage container 11, sides of the container are identified as 12 and 13, the ends as 14 and 15 and the bottom section as 20. The dividers perpendicular to the sides are identified as 16 and 17, with the subdividers perpendicular to the end sections being identifield as 18 and 19. Lips to hold the top are shown as 23 and 23A.

Figure 2:
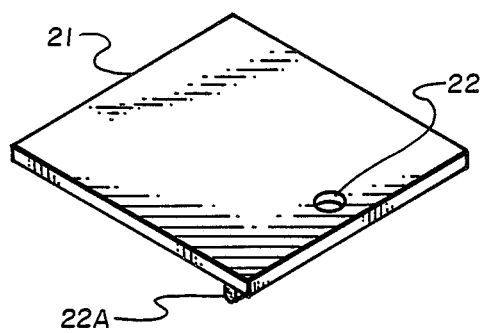
FIG. 2 is a perspective drawing of the top to be placed over part of the storage container.

In FIG. 2, the top covering all but the front section is identified as 21 with the handle to lift up the top as 22 and the ledge under the top to prevent the top from sliding off as 22A.

Figure 2A:
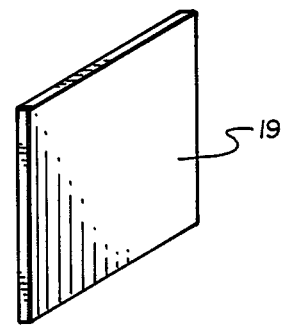
FIG. 2A is a side view of the adjustable sub-dividers used to divide the compartments into other sections.

FIG. 2A illustrates the type of subdivider shown in FIG. 1 and is identified as 19. Such divider can be of any size or shape.

Figure 3:
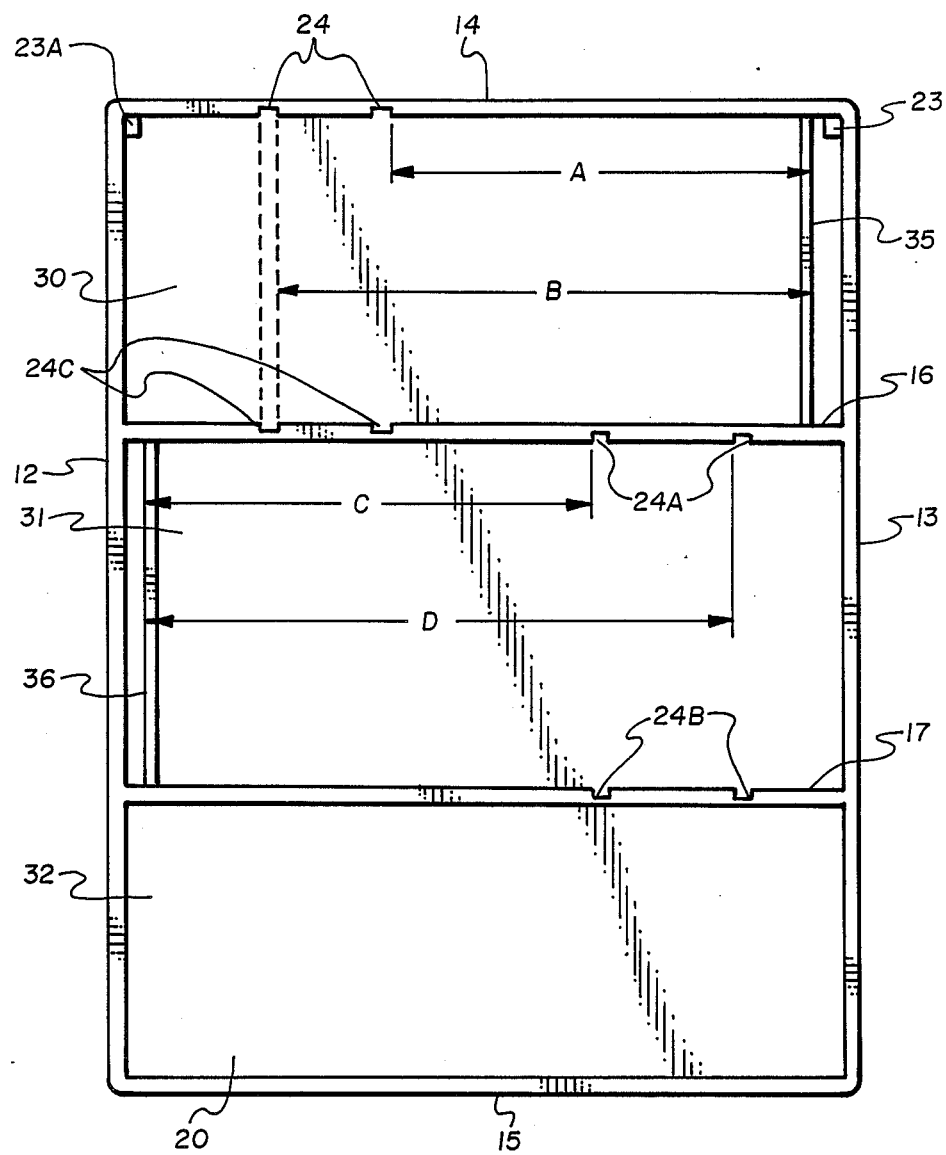
FIG. 3 is a schematic drawing of a top view of the storage container showing the various dividers.

With reference to FIG. 3 which is a top of the container, the sides are identified as 12 and 13, the ends as 14 and 15, and the floor as 20. The dividers perpendicular to the sides are shown as 16 and 17 which dividers separate the container into a front compartment 32, and the back compartments 31 and 30. Slots in the two dividers made to receive the subdividers are shown as 24, 24A, 24B and 24C. The placement of the subdividers is illustrated with dotted lines as 18. Lines A, B, C and D illustrate the possible locations of the subdividers and the type of compartments formed therewith. The lips to hold the top on the back side are shown as 23 and 24. Rod holders for use of file hanging folders are shown as 35 and 36.

Figure 4:
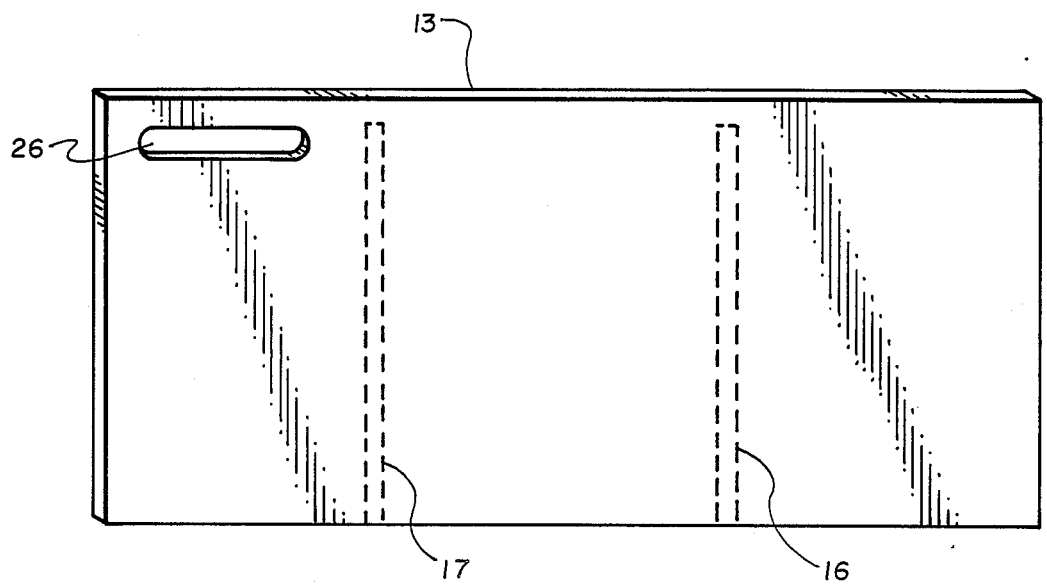
FIG. 4 is a side view of the storage container.

FIG. 4 which is a side view of the container shows the side 13 with the opening for the handle as 26. The presence of the dividers within the container is shown as 16 and 17.

Figure 5:
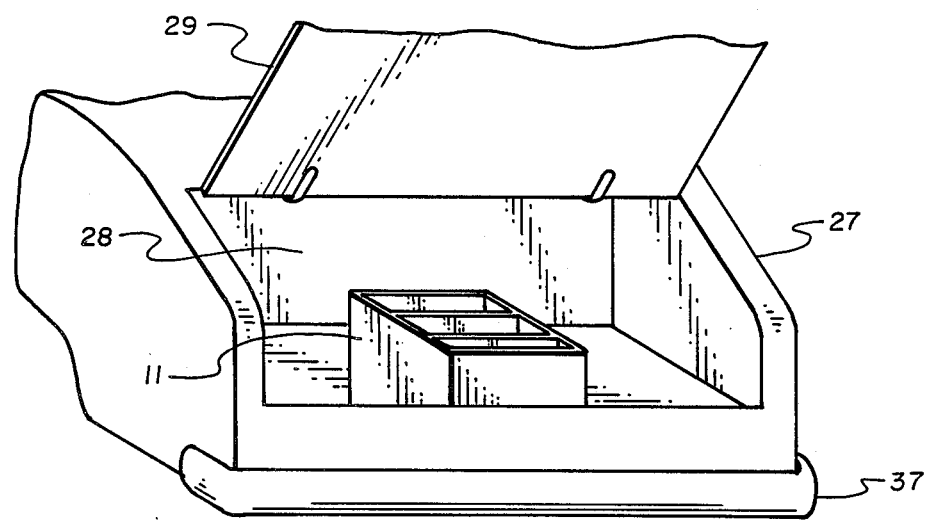
FIG. 5 is a schematic drawing showing how the storage container is retained in the trunk of a vehicle.

With reference to FIG. 5 wich is an open trunk holding the storage container, the trunk is shown as 27 with the opening as 28, the storage container as 11 with the door as 29 and bumper as 19.

DETAILED DESCRIPTION OF THE INVENTION

The storage containers of the present invention can be prepared from any plastic sheet material. The sheet material should be thick enough to support the box type structure and generally varies from about 3/16 to ½ inches in thickness. Preferably, the sides, bottom, ends and top are prepared from ¼ inch thick plastic sheeting. The sheeting is preferably clear and colorless but may be filled with coloring material, such as white, black, red and the like. The colorless material makes it much easier for quick identification of the material in the box.

The plastic material may be of any suitable composition which presents a strong and flexible sheeting. Such materials include polymethyl methacrylate, polyvinyl chloride, polycarbonates, polyethylene, polypropylene, and mixtures thereof. Polymethyl methacrylate is particular preferred as the material to be used in making the components noted above.

The height of the storage container may vary from about 10 to 12 inches and thus will fit in all types of trunks now available. In the event the trunk is deeper than normal, the height of the container may also be increased.

The width of the storage container should be sufficient to accomodate a conventional brief case and as such should generally vary between 17 and 19 inches. Preferably the width should be about 18¾ inches.

The length of the storage container in order to fit most trunk spaces should generally be less than about 28 inches, and more preferably from about 24 to 26 inches in length.

As noted, plastic dividers are inserted in the storage container perpendicular to the sides to divide the container into at least three individual compartments. Such dividers are permanently fixed to the sides, such as by the use of adhesives, by use of screws and the like. The height of the dividers are slightly less than the height of the sides so as to permit the top to fit down within the container and rest on the said dividers.

The plastic sheeting used in making the dividers may be any of that described above. The dividers may be of any suitable width in sheeting, but is preferably from 3/16 to ½ inch in thickness.

While the number of compartments noted above is preferably three so as to utilize only two of the dividers, additional compartments, say from 2 to 4, may be utilized as desired or necessary.

The compartments in turn are divided as needed by sub-dividers which are adjustable and held in place by the use of slots or other means on the compartment dividers. Such dividers are placed in a perpendicular position in relation to such compartment dividers and located in the place required by the nature of the materials to be stored. In the case of small objects, such as maps and small brochures, the sub-dividers could be placed rather close together and could vary from 2 to 4 for each compartment.

Rods or other material can be fixedly attached to the dividers as appropriate locations to hold any hanging folders that might be used in the compartments, one end of the folder hanger being attached to the rod and the other end could be attached to the top of the sub-divider.

The plastic sheeting used in making the sub-dividers can be of any of that described above. The dividers may be of any suitable width in sheeting, but are preferably from 3/16 to ½ inches in thickness. The height of the sub-dividers should of course be less than the sides and about the same height as the compartment dividers so as to provide a level place for the top to fit within the storage container.

As noted, a plastic top is provided to fit over all of the compartments except the first front compartment that is prepared for any tall brief case or other object to be stored. The size of the top should then be determined by the length and width of the remaining compartments.

The top can be attacted to one end of the container by hinge means or can be made to lay loose on top of the compartments. At any rate lips may be attached to the inside of the corners of the container box to provide a means for support of the lid as it is placed within the inside of the container. An opening or handle may be provided at the front top of the top to provide easy means for raising and removing the top as needed.

The storage container is a self contained unit and can be easily placed in and removed from the trunk as needed. Openings or handles may be provided on each side of the container to provide easily handling of the container.

The container can be utilized by just placing the container in the trunk without attachment, or it can be attached to the floor of the trunk by bolt or other means. When made with the above-noted dimensions the containers should fit into any of the conventional trunks and be of great utility for the operator.

SPECIFIC EMBODIMENT OF THE INVENTION

A specific embodiment of the new storage containers of the present invention and illustration of its use are illustrated below.

A storage container was prepared by cutting ¼ inch thick sheets of polymethyl methacrylate to form an open top box having a bottom size 18¾ inches in width and 25 inches in length, ends size 18¾ inches in width and 11½ inches in height, and the sides 25 inches in length and 11½ inches in height. The bottom, sides and ends were joined together by adhesive.

A compartment divider prepared from 3/16 inch sheet of polymethyl methacrylate was placed inside the storage container about 7 inches from the front end and perpendicular to the sides. The divider was attached to the sides by means of plastic adhesive. The height of the divider was slightly lower than the sides to provide a place for the top to rest.

A second compartment divider was prepared from the 3/16 inch sheet of polymethyl methacrylate and placed 9 inches from the first divider. This provided a compartment of 9 inches in width and the next compartment of 8 inches in width.

The first and second dividers were slotted as shown in the drawing in FIG. 3 to provide an adjustable place for the sub-dividers.

The last two compartments were then sub-divided by placing plastic sheets of 3/16 inches in thickness in the slots provided in the compartment dividers. Two sub-dividers were placed in each of the compartments to form three suitable compartments for maps, brochures and the like. Suggested subdivisions are shown in FIG. 3 as lines A, B, C and D. Sections A and C could preferably be about 12⅛ inches in width, while sections B and D could preferably be about 15⅛ inches in width.

The top of the container is a polymethyl methacrylate 3/16 inch thick sheet which was cut so that it would fit within the walls of the container and rest on the compartment dividers. A ledge fixedly attached to the front bottom section of the top was inserted to keep the top from slipping forward. The back of the top rests on the ½ inch lips attached to the corners of the back of the box. A 1 inch opening was provided at the front of the top to permit easy removal of the top as needed.

The storage container so prepared was placed in the trunk of a four door sedan and used for the filing material of a real estate agent. It was found to be ideally suited for his purpose and similar containers were readily used by others for use in their trunks.

I claim as my invention:

1. A storage container for use in storing material in a trunk of a vehicle comprising in combination a rectangular open top box from 10 to 12 inches in height and having a bottom, two sides and two shorter end members prepared from clear plastic sheet, a first set of clear plastic divider members fixedly attached perpendicularly to the two sides and dividing the box into at least three separate compartments, the first and front compartment being from six to eight inches in width and capable of receiving a brief case, the second and third and other compartments possessing adjustable sub-divider sheet members dividing each compartment into at least two subsection compartments, said sub-divider sheet members being perpendicular to the ends of the box, and a clear plastic sheet member removable top which covers all but the first front compartment of said box.

2. A storage container as in claim 1 wherein a hand size opening is located on both sides of the container to assist in the lifting or moving of the container.

3. A storage container as in claim 1 wherein the width of the container varies from about 17 inches to 19 inches.

4. A storage container as in claim 1 wherein the subdivider sheet members in the second and third compartments are made adjustable by means of indented vertical slots located on the inner side of the first set of plastic divider members.

5. A storage container as in claim 1 wherein the plastc sheet top fits inside the walls of the container and rests on lips attached to the end sections of the container.

6. A trunk of a vehicle containing the storage container defined in claim 1.

7. A trunk of a vehicle containing a storage container as defined in claim 1 wherein the container is removably attached to the floor of the trunk.

* * * * *